United States Patent Office 3,371,012
Patented Feb. 27, 1968

3,371,012
PRESERVATIVE FOR EYE GRAFT MATERIAL
Tamotsu Furuhashi, Yokosuka-shi, Japan, assignor to Seikagaku Kogyo Company, Ltd., Tokyo, Japan, a corporation of Japan
No Drawing. Filed July 29, 1965, Ser. No. 473,526
Claims priority, application Japan, Aug. 7, 1964, 39/45,051
3 Claims. (Cl. 167—59)

ABSTRACT OF THE DISCLOSURE

This invention relates to a galacto-acid-mucopolysaccharide which consists of galactose, N-acetylglucosamine and a sulfate in the ratio of 1:1:1 to 2 mols. The principal use of this polysaccharide being for an eye lotion and for preserving corneal graft materials. This galacto-acid-mucopolysaccharide is derived from the intervertebral cartilage of the shark belonging to the elasmobranchii family.

This invention relates to a method of manufacturing a galacto-acid-mucopolysaccharide which consists of galactose, N-acetylglucosamine and sulfate in the ratio of 1:1:1 to 2 mols, with special reference to its use as a preservative for cornea grafts and use as an eye lotion.

It is an important and direct factor for eye corneal grafts that the cornea retain transparency and, that the outer skin of the cornea contain a certain amount of water.

When the eye-ball or the cornea removed from the eye-ball is preserved in a salt solution, the function of the cells diminishes, water enters and produces swelling, and the transparency of the cornea decreases or is lost.

It has been found that acid-mucopolysaccharide as obtained by this invention is similar to the mucopolysaccharides found in the cornea and is highly effective as an agent to regulate the water content in the cornea and for preventing swelling.

An isotonic solution of the acid-mucopolysaccharide obtained by the method herein described, or a mixture of the above with either one or several of the following: calcium chloride, sodium chloride, potassium chloride, magnesium sulphate provides a preservative solution for either the eye-ball or the cornea removed from the eye-ball, whereby the osomotic pressure on the inside and outside of the cornea is controlled so that the water content within the cornea is retained at a constant level. Thus the functions of the cells remain normal and swelling is prevented, the transparency of the cornea is retained for a period of several days.

The acid-mucopolysaccharide obtained by this invention is entirely non-toxic, thus when applied to keratoplasty there is no unfavorable sense of foreign bodies, also there are no ill effects such as anaphylaxis, etc. For cornea transplants, and treatment of corneal wounds, application of acid-mucopolysaacharide regulates the water content of the cell structure and thus retains normal functioning of the cells and metabolism. It also provides protection to the outer skin of the cornea.

This invention permits utilization of cartilage obtained from vertebrates such as of the elasmobranchii family as its prime source, the cartilage is treated with proteinase weak alkaline solutions or salt solutions to extract galacto-acid-mucopolysaccharide; and settled after purifying the extract, and dried. The substance obtained is a polymer consisting of galactose, N-acetylglucosamine, sulfate in the ratio of 1:1:1 to 2 mols.

The proteinase used for extracting can be applied most usefully under optimum conditions to a collagenous protein. When using weak alkaline solutions for extracting, alkali salts can be obtained depending upon the alkali utilized. The solution containing the extract is prevented from further decomposition by cooling and neutralizing. When a salt solution is used, raising of the temperature to the boiling point of the liquid is permitted. By utilizing the aforementioned techniques, the cartilage is changed to liquid form which is an acid-mucopolysaccharide. The product can be used in this form or, by further purification, or by grading the content of galacto-acid-mucopolysaccharide contained in the solution the product can be used as desired.

Under normal conditions, the extract in liquid or dried form contains proteins, sugars, inorganic substances and degraded products as well as compounds formed with the chemicals used for extraction from the aforementioned cartilage. Therefore elimination of these impurities comprises the main objective of the purifying in the process of manufacturing galacto - acid - mucopolysaccharide. This elimination process can be stated as follows:

(a) Elimination of proteins such as collagen and its derivatives.
(b) Elimination of sugars other than galacto-acid-mucopolysaccharide.
(c) Eliminnation of organic low molecular substances such as amino-acids and inorganic low molecular substances such as alkaline salts and sulfates, both being derivatives of the cartilage and the extracting chemicals.

All or part of these purifying processes may be employed depending on the requirements.

To further describe the purifying process, for the elimination of protein, and its degraded products, plant proteinase such as papain, bacterial proteinase such as Pronase, animal proteinase such as pepsin, may be used under optimum conditions to break down the protein. Another method is to utilize cation exchange resin and absorb the basic groups such as peptides. Still another method is to shake the solution with chloroform and separate the protein in its gel state. Another method is to control to pH of the solution to the isoelectric point of protein and precipitate it. Another method is to form precipitations of the galacto-acid-mucopolysaccharide by adding a salt as quarternary ammonium salt and thus separating it from other soluble proteins. Another method is to add ammonium sulfate and by salting-out, precipitate the protein. In another method the desired substance is changed to the soluble state by use of a phenol solution, and recovered by absorbing in kaolin or acid clay, which are absorbents for protein.

For the elimination of other saccharides, from galacto-acid-mucopolysaccharide, carbohydrase is used under optimum conditions. The separation of the saccharides is by means of the difference in their solubilities in organic solvents such as alcohol. Also use may be made of the column-chromatography of high molecular substances such as cellulose, DEAE-Sephadex or Ecteola-cellulose.

In the method described above where an alcohol solution is utilized for fractional precipitation caused by the differences in solubilities of the salts of the saccharide, calcium acetate is used as an additive, and precipitation of the saccharide as a two charge cation salt represented by calcium is between 40 and 65% alcohol, when sodium acetate or potassium acetate is added. Precipitation of the saccharide as a single charge cation salt represented by sodium can be obtained at the final concentration of 45 to 75% alcohol in a cold room. In both of the above cases the saccharide obtained is galacto-acid-mucopolysaccharide. Furthermore, in this process when using alcohol solutions, low molecular substances contained in the solution are effectively eliminated. When the precipitate of the desired saccharide is dissolved in distilled water and alcohol fractionation as described previously is repeated, other saccharides and lower molecular substances are eliminated. Still other methods of eliminating low molecular substances are by utilizing semipermeable membranes such as urinary membrane, Cellophane, etc., and dialyzing or electrodialyzing; using a column such as Saphadex to separate the saccharides; treating with metal ions such as barium and separating the precipitates; using ion-exchange-resin to absorb the ionic compounds of saccharides and selectively precipitating the saccharides by adding organic solvents such as alcohol. These processes can be used singly with satisfactory results, however, extremely effective results are obtained by combining the processes. The galacto-acid-mucopolysaccharide obtained by the above purifying processes may be in liquid form, however it is more convenient to store as a precipitate, or in solid form. The following is an example of this process.

*Example 1*

11 parts of a homogenate of shark-cartilage of the elasmobranchii family is soaked in a 5% solution of sodium carbonate to which a small amount of formalin is added after which the solution is heated up to a temperature of 70° C. and is stirred for 3 hours. The temperature for extraction can be below 70° C., however, as the temperature is decreased, a longer time for extraction is required to obtain the same results. This extract which contains crude substances is filtered by passing through a Celite layer (a layer of infusorial or siliceous earth), and the pH of the filtrate is adjusted, by addition of glacial acetic acid, to a value of 4.7. The value of pH in this instance can be between 2.5 and 5.5. Also for controlling the pH value, a mineral acid such as hydrochloric acid can be used instead of organic acid. The solution is shaken for 30 minutes after addition of 0.1 part of kaolin, it is again filtered and the solid substance removed. In this manner, nearly all the protein can be successfully removed, to further remove the remaining small amount, 20% by volume of chloroform is added to the solution and after shaking for 20 hours, in conjunction with a foam eliminating agent, the protein which is now in gel form can be separated by means of a centrifuge. Then three volumes of alcohol are added to the supernatant fluid and the precipitate which is obtained is dried in a vacuum drier, and a solid precipitate is obtained. This solid is dissolved in 2 parts of distilled water and is absorbed in a column packed with 10 parts of an anion exchange resin such as Dowex 1x2 Cl form. After which the column is completely washed with distilled water. Then a solution of 1.5 mols of sodium chloride is passed through the column, until the fluid obtained through the column shows no trace of uronic acid. After this a 3.5 mols solution of sodium chloride is passed through the column, in this manner the effluents of galactose positive are collected and condensed in vacuum, and the solution is dialyzed with running water for one day. Three volumes of alcohol are added to the dialyzed solution which is allowed to precepitate completely in a cold room for one day, after which the supernatant fluid is removed and after washing with absolute alcohol the precipitate is dried in a vacuum drier. In this manner, 0.03 part of the substance is obtained which contains 29% of galactose. The ratio of galactose, N-acetylglucosamine, sulfate for the substance is 1:1:1.6 mols. The specific optical rotation of the substance solution is 5.4° in neutral solution.

*Example 2*

10 parts of the intervertebral cartilage of sharks belonging to the elasmobranchii family is sliced in a slicer after which it is soaked in 50 parts of buffer solution of pH 6–9. To this solution, 0.02 part of a commercial proteinase by the name of Pronase are added with a small amount of tuluol. The solution is retained at a constant temperature of 50° C. for 2 days, with periodic stirring and an extract solution is obtained. This extract is filtered, and commercial hyaluronidase is added and the mixture is heated to a temperature of 37° C. The reaction is continued until the increase in reducing power becomes unrecognizable, after which the extract is transferred to a urinary membrane and is dialyzed, by running water for 24 hours after which time the remaining extract is condensed in a vacuum. A solution of cetyl-pyridinium chloride is added and the precipitate is collected, and this mixture is washed with a 0.1% solution of cetyl-pyridinium chloride. The supernatant of the precipitate contains a large amount of protein and its derivatives which can be separated. The precipitate is placed on the top of a 400 part cellulose column and is developed by means of a 1% cetyl-pyridinium chloride solution and the various fraction of galactose are collected, and condensed in vacuum. Next a saturated sodium chloride solution is dropped on the galactose after which three volumes of alcohol are added and the whole is mixed to produce a precipitate, which after washing with absolute alcohol is dried in vacuum. As a result of these operations 0.04 part of the substance containing 29% of galactose is obtained. The substance obtained has a ratio of galactose, N-acetylglucosamine, sulfate as follows: 1:1:1.2 mols.

Hyaluronidase is added to the above described extract solution and the whole is heated to a temperature of 37° C., and calcium acetate is immediately added and dissolved, until the final concentration of calcium acetate reaches 5%, after which acetic acid is added and the pH adjusted to 4–5. Alcohol is then added until the concentration reaches 40% after which the extract is mixed and allowed to precipitate overnight in a cold room. The precipitate is separated in a centrifuge and dried in vacuum, and 0.05 part of the substance is obtained. This substance contains 3% of galactose which is composed of a heteropolysaccharide which has glucuronic acid as its main component.

The supernatant of the above described 40% solution of alcohol is treated as follows: Alcohol is added until its final concentration reaches 65% after which the solution is left to precipitate overnight. The precipitate obtained is collected, and washed with absolute alcohol, acetone, or ether, after which it is dried on a phosphorus pentoxide. The dried substance is dissolved in 1 part of distilled water and this solution is passed through a cation exchange resin (H form) then through an anion exchange resin (OH form) and neutralized with a weak solution of caustic soda. It is then condensed in vacuum to form a syrup like substance which is dried by freezing, and 0.05 part of white powder is obtained. This substance contains 25% of galactose, and the molar ratio of galactose, N-acetylglucosamine, sulfate is 1:1:1.1 mols. The specific optical rotation rotary of this substance is 4.1°.

Furthermore, after treating with hyaluronidase then dializing as described above, cation exchange resin (H form) can be added and after stirring for a certain period, the resin can be filtered and removed, and after mixing with kaolin, and filtering off the kaolin, the clear fluid obtained is mixed with 4 parts of alcohol and the precipitate obtained is separated in a centrifuge and dried. 0.05 parts of the substance containing 26% of galactose is obtained.

*Example 3*

4 parts of dried cartilage of shark belonging to the elasmobranchii family is soaked in water overnight, and after absorbing water and swelling, is chopped and homogenized, and treated with a 22 parts of a saturated salt solution and heated for 3 hours at a temperature of 90° C. and filtered. After filtering, the residue is soaked in a 22 parts of a saturated salt solution at a temperature of 98° C. for 3 hours and is again filtered. The filtrate is combined and is poured into a Cellophane membrane and is dialyzed for 70 hours. The extract is condensed in vacuum and is saturated with ammonium sulfate, the precipitate is separated in a centrifuge, and low molecular substances are eliminated by passing through a Sephadex column, and the effluent is condensed in vacuum, and the concentrated solution is treated with alcohol saturated with potassium acetate. The fractional precipitate is between 50% and 75% alcohol concentration and is collected, and dried and 0.02 parts of the substance containing 15% of galactose is obtained. The ratio of galactose, N-acetylglucosamine, sulfate for this substance is 1:1:1.6 mols.

By using a 0.5 N solution of caustic soda instead of the saturated salt solution, 0.06 part of the substance containing 19% of galactose can be obtained in the same way as described above. The ratio of galactose, N-acetylglucosamine, sulfate for this substance is 1:1:1.6 mols.

*Example 4*

10 parts of cartilage of the shark is soaked in a 0.5 N solution of caustic soda for one night and then heated at a temperature of 45° C. for 2 hours to dissolve the cartilage. By adding a dilute acetic acid, the extract is acidified forming a white precipitate which is filtered in a kaolin layer. Papain is added to the filtrate under optimum conditions after which calcium hydroxide is added and the pH of the solution made to 4.5 and the solution is filtered to obtain a clear fluid. Alcohol is added and a precipitated obtained when the concentration of the alcohol is between 45% and 80% and is collected and after washing with absolute alcohol and drying in vacuum, 0.03 part of the substance containing 17% of galactose is obtained. The ratio of galactose, N-acetylglucosamine, sulfate is 1:1:1.1 mols.

Pepsin can be utilized instead of the papain as described above, in which case 0.03 part of the substance containing 15% of galactose is obtained. This substance consists of galactose, N-acetylglucosamine, sulfate in the following rations, 1:1:1.1 mols.

*Example 5*

The extract obtained from the cartilage of shark as described in Example 2 above is treated with acriflavine and the precipitate formed is collected. This is placed in a 20% solution of calcium chloride and heated for one hour at a temperature of 60° C. after which the sodution is separated in a centrifuge. The supernatant is treated with four volumes of alcohol to produce precipitates. The precipitate is dissolved in a 2% solution of calcium acetate and is acidified. The precipitate is then washed with alcohol at a concentration of 40 to 65% and dried in vacuum. 0.03 part of the substance containing 12% of galactose is obtained from 10 parts of starting material. The ratio of galactose, N-acetylglucosamine, sulfate is 1:1:1.1 mols.

In the above described process, use of the extract solution as obtained by treating with papain as described in Example 4 prior to treating with acriflavine will produce 0.03 part of the substance containing 17% of galactose. The ratio of galactose, N-acetylglucosamine, sulfate is 1:1:1.1 mols.

*Example 6*

10 parts of homogenized shark cartilage is mixed with a 0.2 part of Pronase solution as described in Example 2 above, and is maintained at a temperature of 40° C. in a neutral solution. The mixture is treated until the increase in amino nitrogen is unrecognizable according to the Van Slyke Method, after which 0.05 part of Pronase is added and the mixture is kept at a temperature of 40° C. for two days. After two days, glacial acetic acid is added to make the pH 4.5 and an equal volume of 95% alcohol is added to cause precipitation and the precipitate is removed. The supernatant is treated by adding two volume of 95% alcohol and mixing, and precipitating and the precipitate is collected and dried in vacuum. 0.08 part of the substance containing 8% of galactose. The ratio of galactose, N-acetylglucosamine, sulfate is 1:1:1.1 mols for this substance.

By repeating the above alcohol fractionation, 0.03 parts of the substance containing 15% of galactose can be obtained. The ratio of galactose, N-acetylglucosamine, sulfate for this substance is 1:1:1.1 mols.

*Example 7*

A 5% potassium acetate solution of the filtered extract obtained by the method described in Example 2 is acidified with weak hydrochloric acid. The fractional precipitate at 50% to 75% alcohol is dried in vacuum, is mixed and shaken with an aqueous phenol solution. Four volumes of alcohol are added to the aqueous layer and a precipitate is obtained which is dissolved in water, after addition of barium carbonate. The solution is then thoroughly stirred. Then the supernatant is passed through a cation exchange resin (H form), and is neutralized by addition of a dilute alkali, and five volumes of alcohol are added and a precipitate is obtained. This precipitate is dried, and 0.01 parts of the substance containing 21% of galactose is obtained. The ratio of galactose, N-acetylglucosamine, sulfate for this substance is 1:1:1.2 mols.

*Example 8*

1 part of the substance according to this invention is added to 100 parts of distilled water containing: purified calcium chloride 2–3 mg. equivalent weight; purified sodium chloride 100–200 mg. equivalent weight; purified potassium chloride 3–4 mg. equivalent weight; and purified magnesium sulfate 2–3 mg. equivalent weight; after which the substance is completely dissolved by stirring at a low temperature. To this solution is added, a solution of sodium carbonate or sodium bicarbonate and the pH of the solution is adjusted to 7.0 to 7.5. This solution is stored in a cool place, and is used when necessary as a preservative for the eye-ball or the cornea removed from the eye-ball, or for an eye lotion for treatment of wounds in the cornea or for transplants of the cornea.

The preservative material consists of an acid-mucopolysaccharide and from 0.1% to 5.0% by weight of a substance taken from class consisting of a salt solution, an isotonic solution and a solution similar in construction to the fluid in the cornea.

When one eye-ball was placed in 100 ml. of the above described preservative, and when kept in a cool place, no clouding of the cornea occurred for several days, and the cornea was preserved in fresh condition. Furthermore, when 50 to 100 mg. of vitamin C is added to 100 ml. of the above solution, still better results were obtained.

*Example 9*

3 parts of the substance described in this invention is added to 100 parts of distilled water containing 0.5 parts of salt. In this way, a solution with a specific viscosity of 0.5–2 is obtained. This solution is suitable for a base material for a viscous eye lotion.

*Example 10*

2 parts of the substance described in this invention and 1 part of the chondroitin sulfate are added to 100 parts of distilled water containing 0.5 parts of salt. In this way, a solution with a specific viscosity of 1–5 is obtained. This solution is suitable for a base material for a viscous eye lotion.

APPENDIX

A glossary of trade names used in the specification:

Celite is the commercial name for certain infusional earths or silicious cartles. Reference: Merck Index, 1952.

DEAE Sephadex is a commercial name for a diethylamino-ethyldextran gel.

Ecteola Cellulose is a trade name for a product from epichlorhydrin, tuethanol amine and sodium cellulose. Reference: Merck Index.

Dowex 1–X2 Cl form. Dowex a trade name of a basic ion exchange resin manufactured by the Dow Chemical Company.

Dowex 1 is an anion exchange resin. The Cl form is the chloride form which changes OH to Cl.

Pronase a trade name for a proteolytic enzyme which extracted from streptomyces gricens. General name: proteinase, Sephadex is a trade name for a dextron gel. Reference: Catalog of Sephadex (Pharmacia Uppsala, Sweden).

Van Slyke method.

Van Slyke's method of determining amino nitrogen content.

What I claim is:

1. A preservative for eye graft material which comprises a composition taken from the class consisting of an isotonic solution of an acid-mucopolysaccharide derived from the cartilage of vertebrates of the elasmobranchii family by treating said cartilage with a solution selected from a class consisting of dilute alkali, calcium carbonate and Pronase to produce a polymer consisting of galactose, N-acetylglucosamine, sufate in the ratio of 1:1:1 to 2 mols, and purifying said polymer by fractionation, and a solution of a mixture of the acid-mucopolysaccharide and from 0.1 to 5.0% by weight of at least one salt taken from the group consisting of calcium chloride, sodium chloride, potassium chloride and magnesium sulphate.

2. The acid mucopolysaccharide according to claim 1 wherein the intervertebral cartilage is used.

3. The acid mucopolysaccharide according to claim 1 in which the cartilage is from a shark.

References Cited
UNITED STATES PATENTS 2,841,578   7/1958   Novak et al. _____ 260—209

ALBERT T. MEYERS, *Primary Examiner.*

SAM ROSEN, *Examiner.*

D. R. MAHANAND, *Assistant Examiner.*